United States Patent [19]
Wirth

[11] 3,815,866
[45] June 11, 1974

[54] PROPORTIONAL ON/OFF VALVE
[75] Inventor: Gary J. Wirth, St. Paul, Minn.
[73] Assignee: Uniflo Systems Company, South Minneapolis, Minn.
[22] Filed: June 2, 1972
[21] Appl. No.: 259,170

[52] U.S. Cl.............. 251/25, 91/13, 251/61.1, 251/60, 104/155
[51] Int. Cl............. B61b 13/08, F16k 31/145
[58] Field of Search........ 251/61.1, 60, 25; 92/13.1, 92/13.2

[56] References Cited
UNITED STATES PATENTS
2,705,595  4/1955  Carlson et al.............. 251/61.1 X
3,446,241  5/1969  Skoli......................... 251/60 X
3,512,550  5/1970  Ammann.................... 251/60 X
3,531,079  9/1970  Greene....................... 251/61.1

Primary Examiner—Arnold Rosenthal
Attorney, Agent, or Firm—Dugger, Johnson & Westman

[57] ABSTRACT

A valve for controlling thrust for levitated vehicles from a source of fluid under pressure to a vehicle that is being levitated and propelled, and used in combination with a vehicle speed control system that uses the time of movement of a vehicle from one point to another as a reference. The amount of opening of the valve is adjusted in accordance with the speed of the vehicle which is to receive thrust from the thruster device.

5 Claims, 3 Drawing Figures 3,815,866

PROPORTIONAL ON/OFF VALVE

BACKGROUND OF THE INVENTION

1. Field of the Invention.

The present invention relates to control valves for fluid systems and more particularly to a valve for proportioning the amount of flow therethrough to levitated vehicles in relation to time reference.

2. Prior Art.

The use of levitated vehicles is well known, and a thruster for propelling vehicles is disclosed in my copending U.S. application Ser. No. 90,257, filed Nov. 17, 1970 now U.S. Pat. No. 3,718,096 for Vortex Thruster for Fluid Propelled Objects. The thruster device shown in the prior application illustrated a simple on/off control valve responsive to vehicle levitation pressure of a vehicle on a track and which could be controlled by some separate timer control. Likewise, a speed and spacing control system for use with track guided levitated vehicles based on an elapsed time for controlling vehicle speed between two points of the track is illustrated in the copending U.S. Pat application of Charles H. Smoot and Lowell A. Kleven Ser. No. 203,256, filed Nov. 30, 1971 now U.S. Pat. No. 3,771,463 for Control Systems for Vehicles Operating On A Track.

The speed control concept is illustrated in the Smoot et al application, and it should be understood that the track construction and the automatic levitation valves described in that application may be utilized, and the present thruster module with the variable thrust valve may be placed into the system of the Smoot et al application.

Further, reference will be made throughout this application to a copending application of Lowell A. Kleven Ser. No. 259,314 for Proportional Thrust Control For Levitated Vehicle Filed on even date herewith, which discloses proportional thrust control modules used with a levitated vehicle for controlling the vehicle speed. The speed control is accomplished smoothly by providing the vehicle with an amount of thrust from the thruster sections which is proportional to the period of time required for a vehicle to travel between two track sections or detectors. No thrust is provided over speed vehicles. Less than full thrust will be provided to some of the vehicles that are very close to their selected speed, and proportionally greater thrust will be provided to slower vehicles and the maximum amount of thrust will be provided to a vehicle that is slower than a preselected speed.

The speeds are measured by timing devices activated by track mounted vehicle detectors. If the vehicle reaches a detector while the timing device is running, the thruster valves are prevented from opening at all (no thrust). If the vehicle reaches a detector an amount of time after the elapse of time period, the thruster valves are permitted to open in response to a separate valve opening signal an amount proportional to that time. The thruster valves will open an amount to limit the amount of fluid under pressure delivered to the vehicle and provide a smooth control for vehicle speed.

The thrust control modules referred to in this application wil be those shown and described in the aforesaid Lowell A. Kleven application, which description is incorporated herein by reference.

SUMMARY OF THE INVENTION

The present invention relates to control valves for fluid flow, the amount of opening of which can be controlled. The control valves are normally opened in response to a separate valve open signal, as shown, a pressure signal from a levitated vehicle. The amount of opening of the thrust valve when the separate valve opening signal is received is controlled by separate means that prevents opening of the thrust valve more than a certain amount, which amount is varied from zero or closed to maximum or fully open. In the form shown, the amount of opening of the valve is controlled by the volume of fluid in the control diaphragm chamber. The main valve diaphragm when activated is supported by a control diaphragm, and the fluid volume in a control diaphragm chamber regulates the amount of movement of the control diaphragm. When the control diaphragm chamber is filled with fluid at a pressure level where the chamber pressure supports the control diaphragm and main valve diaphragm in a closed position the valve is prevented from opening even when the separate valve open signal is received. As fluid under pressure is bled away from the control diaphragm chamber, the amount of movement of the control diaphragm and therefore the amount of opening of the main flow diaphragm permitted when a valve open signal is received is proportional to the volume of fluid bled out of the control chamber.

The valve disclosed has a wide variety of usages in fluid control systems when a valve is to be regulated as to its amount of opening in response to pressure signals, separate from the signals which cause the valve to open at all.

Figure 1:
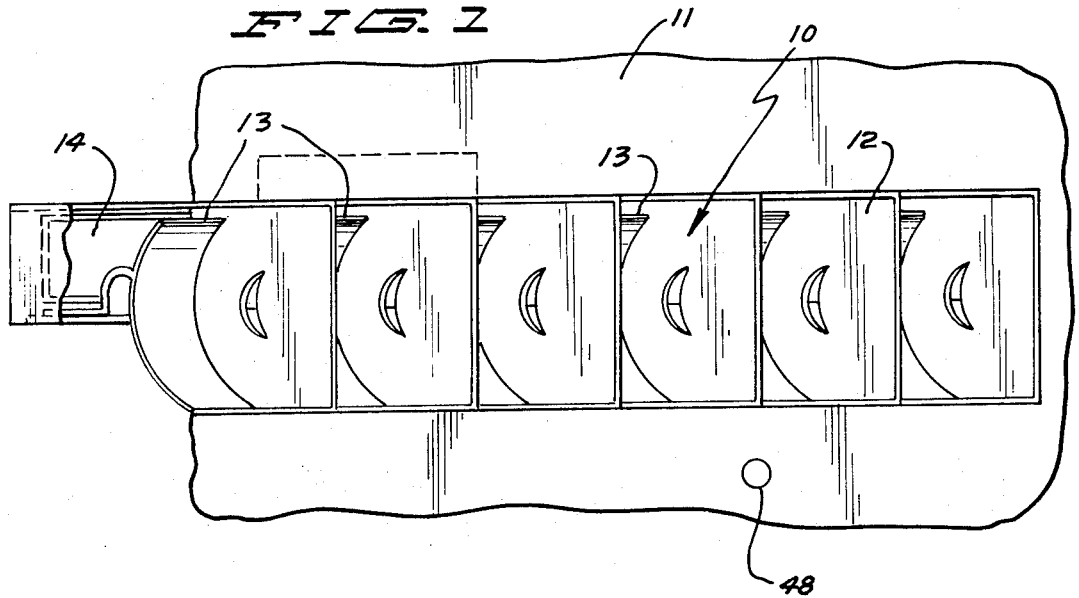
FIG. 1 is a top plan view of a portion of a vehicle track including a thruster section made according to the present invention.

Referring first to FIG. 1, the turbine vortex thruster section indicated generally at 10 is mounted into the deck 11 of a vehicle track over which levitated vehicles will move. The thruster section 10 includes, as shown, a plurality of turbine buckets 12 and the general operation of this type of thruster is fully described in my copending United States application Ser. No. 90,257, filed Nov. 17, 1970 and previously identified.

Figure 3:
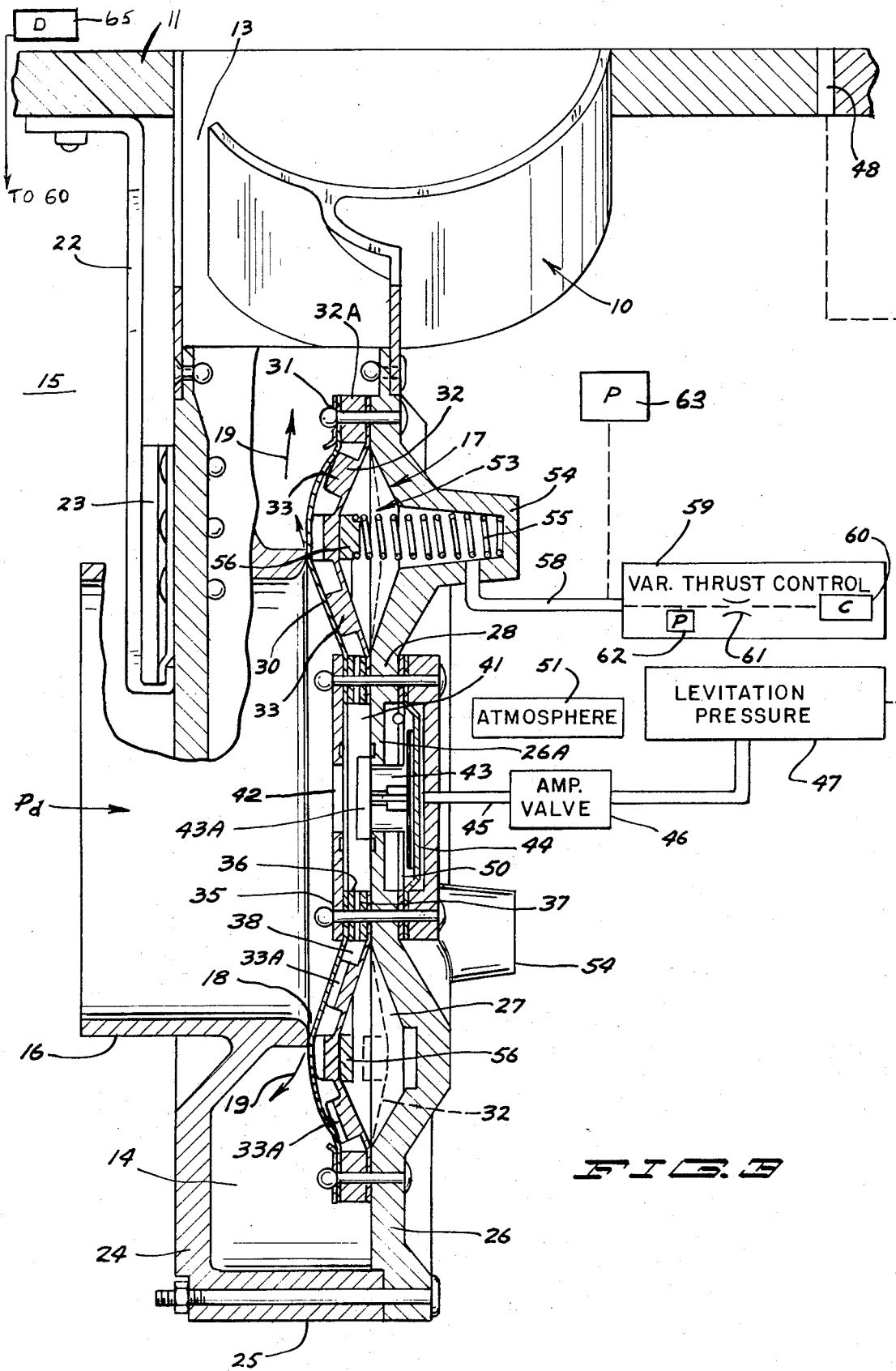
FIG. 3 is a sectional view taken as on line 3—3 in FIG. 1 with portions of the control shown schematically.

The buckets 12 each have an inlet opening 13 along one side thereof which is open to a plenum chamber 14 (see FIG. 3). The plenum chamber is an annular chamber in the valve housing and which is open to all of the openings 13 in the thruster section.

When the turbine buckets 12 are supplied with fluid under pressure, the fluid from a pressure source, which is in communication with a duct 15 underneath the deck 11, will flow as indicated by the arrow indicated at $P_d$ through a inlet duct tube 16 into the plenum chamber 14 past a thrust control valve assembly indicated generally at 17, which has a diaphragm 30 that seals against the inner edge of the annular duct 16 as shown at 18. The fluid flows, as shown by the arrows 19, into the plenum chamber 14 and out through the openings 13 into the respective turbine buckets. The vehicle being used normally has a matching set of reactor turbine buckets to produce a satisfactory amount of forward thrust in relation to the amount of fluid being supplied by valve assembly 17.

The means of providing the thrust to the vehicle can be of any desired arrangement and the preferred embodiment includes the type of turbine bucket illustrated.

The entire valve assembly including the turbine buckets is mounted with a suitable bracket 22 that is attached to the deck 11, and includes a mounting plate or clip 23 on the body of the valve 17.

Figure 2:
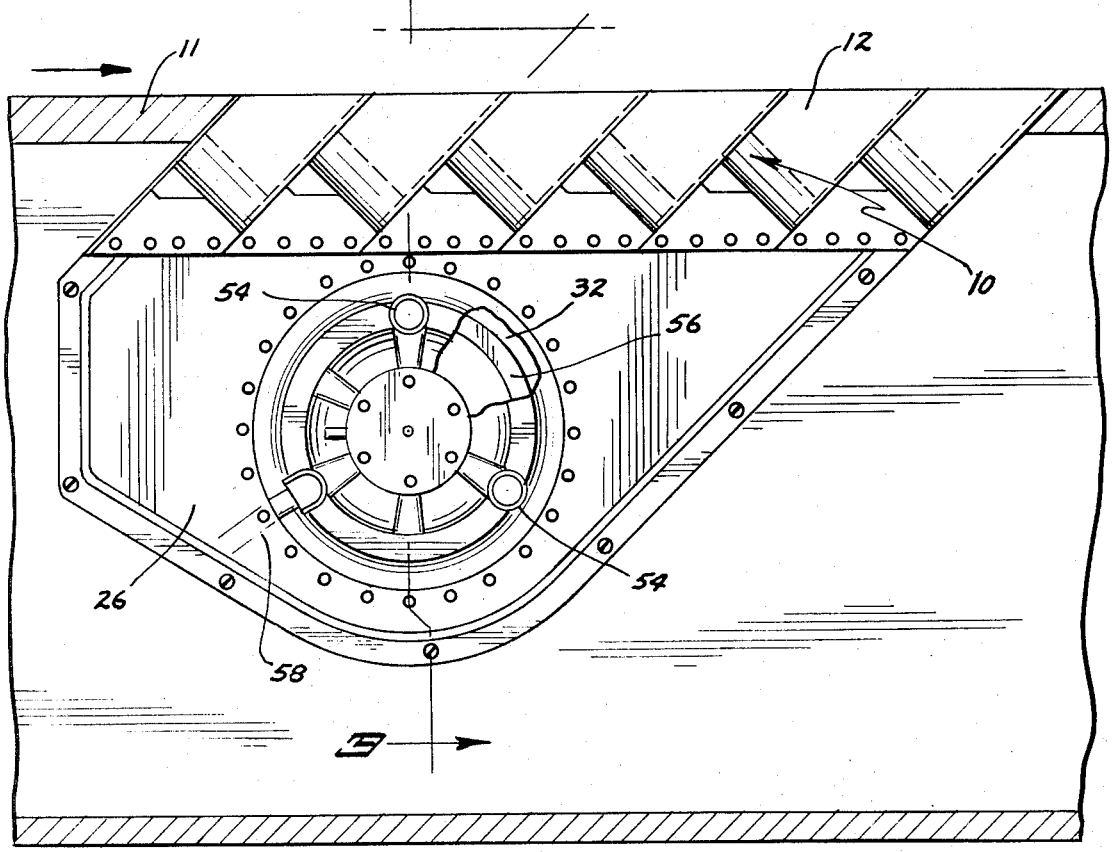
FIG. 2 is a side elevational view of the device of FIG. 1.

The valve 17 itself includes a side wall member 24 in which the sleeve 16 is integrally formed. The member 24 includes a peripheral wall 25 that forms the outer wall of plenum chamber 14, and this peripheral wall 25 is used to support a closure or cover wall 26. The closure wall 26 is used for mounting the valve diaphragms and forming the necessary chamber, and is formed with an annular internal recess indicated at 27 therearound. The wall 26 includes a center mounting flange portion 28 in the center portions thereof. The wall 26 supports the turbine buckets 12 as shown in FIGS. 2 and 3.

The control of fluid flow through the valve past the sealing edges of inlet tube or duct 16 is accomplished by the use of a flexible diaphragm 30 that is sealed adjacent its outer edges as at 31 to the wall 26, and which overlies the recessed area 27 of wall 26. In addition, a flexible support or control diaphragm 32 is mounted with the same rivets as the diaphragm 30 around the edge indicated at 31 and is spaced from the main diaphragm 30 with a suitable peripheral spacer 32A. The diaphragms are kept spaced with molded lugs 33 on diaphragm 32 that extend around the periphery of the unit. The lugs 33 may have passageways 33A defined thereacross. The two diaphragms 30 and 32 define a fluid chamber 38 between the diaphragms.

The diaphragms 30 and 32 are flexible annular diaphragms defining an open center and they are clamped in the center portions of the recessed area 27 against wall portion 28 with a clamping plate 35. The clamping plate 35 seals the two diaphragms 30 and 32 together and with respect to the wall portion 28. A suitable spacer assembly 36 is used between the diaphragms at the inner edges of the diaphragms. This spacer assembly 36 includes radial passageways 37 so that fluid under pressure can enter into the chamber 38 formed between the two diaphragms.

The plate 35 is spaced from the center portions 26A of the wall 26 to form a chamber 41 in the center portions of the valve assembly 17. The chamber 41 is open to the interior of the duct 16 through an opening 42. A poppet valve 43 is mounted in this chamber with a shank slidably mounted through an opening in wall portion 26A, and the valve has a head 43A that is made to seal either against the center wall portions 26A in its solid line position or against the inner surface of the wall 35 around opening 42 in a second position. This valve 43 is controlled by a pilot diaphragm 44 that is open to a control chamber that in turn has a conduit 45 connected thereto. An amplifier valve shown at 46 is controlled by a levitation pressure signal shown at 47 which is delivered through a port 48. The levitation pressure is the pressure signal underneath a levitated vehicle above the deck 11, and this signal is used as the signal to normally open the valve assembly 17.

The poppet valve 43 is normally in its solid line position with the valve head 43A closing off the opening through the wall portions 26A. The chamber indicated at 50 on the opposite side of the diaphragm from the conduit 45 is open to atmospheric pressure as indicated schematically at 51. The valve shank of poppet valve 43 is made in a cross shape to provide fluid passages along the shank through the opening for the shank so that when the valve head 43A is in a position against the surface of the ring 35 closing off the opening 42 chamber 41 is open to atmospheric pressure in chamber 50 through the passages defined around the shank of the valve 43.

The flexible control diaphragm 32 overlies the recessed area 27 formed in the wall 26 and forms a control chamber 53 for controlling the amount of valve opening. The chamber 53 is an annular chamber extending around the periphery of the valve. A plurality of spring pockets 54 (as shown three are provided) are formed in wall 26. These pockets 54 each house a separate spring 55 inside chamber 53. The springs act against an annular load ring 56 positioned on the side of the diaphragm 32 opposite from the diaphragm 30. This load ring 56 distributes the load from the springs 55 around an annular band on the control diaphragm 32 tending to urge the control diaphragm 32 toward duct 16 and a valve closed position. The springs form a bias means tending to urge the control diaphragm 32 toward the valve closed position. The chamber 53 has a conduit 58 connected thereto. The circuit 58 is connected to a thrust control module 59 which is used to regulate the amount of thrust provided by the valve.

The thrust control module 59 is fully described in the copending application of Lowell A. Kleven Ser. No. 259,314 filed on even date herewith mentioned previously, and includes, as shown schematically in the thrust control module block 59, a clamping or shut off valve 60, a bleed orifice 61, and a source of duct pressure 62. Duct pressure is the same as the pressure $P_d$, and is used so that there is substantially equal pressure at the source 62 and also at the inlet duct 16.

A separate thrust valve inhibit signal from a separate pressure source indicated at 63 in FIG. 3 may be provided. This separate pressure signal from pressure source 63 may be used to inhibit (or hold closed) the thrust control valve whenever there is a pressure present from source 63. This valve inhibit signal usage is disclosed in the copending U.S. Patent application of Charles H. Smoot and Lowell A. Kleven, Ser. No. 203,256, identified previously to inhibit the thrust control valves to provide a "stop block" in a vehicle track system when any vehicle on the deck 11 in the vicinity of thruster assembly 10 should be stopped because of the pressure of another vehicle immediately ahead of it. The pressure signal 63 is usually from a device used to detect a vehicle a short distance ahead of assembly 10 on the deck 11. The signal 63 can also be used to inhibit the valves by connecting the signal to chamber 50 for the poppet valve.

The variable thrust control is coordinated with a speed sensing device for a vehicle on deck 11. The pressure from source 62 is delivered whenever the speed sensing device indicates that a vehicle reaching port 48 would be going too fast. As fully disclosed in the Kleven application this speed sensing is normally a timer used for timing vehicle travel between two established references on deck 11. Assuming that a pressure signal from source 62 is applied through the conduit 58 to the chamber 53. This pressure from source 62, which is a vehicle speed or timer signal means urges the diaphragm 32 to its solid line position. The springs 55 are loading against the load ring 56, and this spring force together with the pressure in chamber 53 overcomes the pressure in chamber 38, which is also duct pressure. The pressure in chamber 38 is provided through the valve opening 42 and passageways 37 in the spacer 36. The pressure in chamber 38 acts on the bottom surface of the main diaphragm 30 causing the diaphragm 30 to seal against the edge of the annular duct 16 to prevent duct pressure from flowing through the interior of the duct 16 into the plenum chamber 14. If there is a levitation signal at port 48 at this time, the pressure in chamber 53 and the spring 55 acting against the undersurface of control diaphragm 32 will independently keep the main diaphragm 30 closed as long as the pressure from source 62 is present in chamber 53. The control diaphragm lugs 33 are positioned to support the diaphragm 30 in its closed position.

Now assuming that the speed control signal removes pressure from source 62, which is a signal from source 62 that it is desirable to provide thrust to a vehicle which subsequently provides a levitation signal at port 48. The pressure source 62 is closed off from conduit 58, and the fluid volume under pressure in chamber 53 starts to bleed out through orifice 61 at a controlled rate. Reduction in the fluid volume in the chamber 53 at this time does not affect the movement of diaphragm 30 because of the duct pressure in chamber 38 between the diaphragm. This pressure will still keep the diaphragm 30 closed to prevent fluid under pressure from passing from duct 16 to plenum 14.

The pressure differential acting on diaphragm 30 is such that the diaphragm 30 will remain sealed against the edges of the duct member 16. The flow through orifice 61 continues either until all fluid has escaped and the pressure in the chamber 53 is reduced to atmosphere, or until the clamp valve assembly 60 is activated. The activation of the clamp valve assembly 60 clamps the orifice 61 closed as is explained in the aforementioned application of Lowell A. Kleven and this will trap a certain amount of fluid in the chamber 53. The clamp valve is operated in response to a signal from vehicle detector for example detector 65 which indicates that a vehicle is close to the thruster assembly 10 and usually prior to the time that this same vehicle provides a levitation pressure at port 48. Vehicle movement is indicated by an arrow in FIG. 2. Assume that the clamp valve has closed the orifice 61 so that the volume in chamber 53 has been reduced. The control diaphragm 32 will be moved to position intermediate its closed position and a fully open position. If a levitation pressure and signal then appears through valve 46, the fluid pressure signal in conduit 45 will act on the pilot diaphragm 44 and move the valve head 43A up against the valve seat in the ring 35 closing off the duct pressure through opening 42, and further opening the chamber 41 to atmosphere through the opening past the valve shank for valve 43.

The pressure in the chamber 38 between the two diaphragms is relieved through openings 37 to chamber 41, and then to atmosphere and the pressure acting against the diaphragm 30 in the duct member 16 will force the diaphragm 30 to move against the control diaphragm 32.

For example, as shown in the dotted line position of diaphragm 32 in FIG. 3, the diaphragm 30 would rest against the lugs 33 on the diaphragm 32 thereby providing opening at 18 for fluid pressure that would be proportional to the amount of fluid bled out of the chamber 53. Assuming that all of the fluid had been bled out of the chamber 53 so that atmospheric pressure was present in the chamber when a levitation signal appeared at port 48, the valve diaphragm 30 would open to its full open position. If the amount of fluid in chamber 53 had bled down very little, the diaphragm 30 could only move a short distance and the opening between member 16 and the plenum chamber 14 would be very small. The amount of the opening of the valve determines fluid flow and therefore, the amount of thrust produced.

The amount of thrust fluid provided to thruster section 10 is based upon the amount of fluid bled out of the chamber 53 prior to the time that the valve is actuated.

On a time elapsed basis, the clamping 60 can come from a timer detecting a vehicle very close to the thruster section, and if the vehicle is traveling too fast the amount of thrust delivered to the vehicle would be zero or could be very low. If the vehicle is relatively slow then the amount of thrust would be proportionally greater.

A proportional thrust control is thus attained using an automatically opening diaphragm valve with the amount of opening of the valve being determined by fluid dynamics through a controlled bleed out from an orifice leading from a control chamber where this bleed is determined by the time elapsed from the occurrence from a preselected event. The proportional opening valve can be used for many other applications where the amount the valve opens is to be regulated separately from the signal which turns the valve on and off.

What is claimed is:

1. A fluid control valve including a valve housing, an outlet opening defined in the housing and leading from a source of fluid under pressure, a first diaphragm sealing said outlet in a closed position and being movable to an open position to control flow through said outlet opening in relation to the amount of movement of said first diaphragm away from its closed position, first signal means controlling the opening and closing of said first diaphragm, said housing forming a chamber on a side of said first diaphragm opposite from said outlet opening, a second diaphragm mounted in said housing and closing one portion of said chamber, said second diaphragm being positioned to be engaged by and to support said first diaphragm when said first diaphragm moves to said open position, the position of said second diaphragm being a function of the volume of fluid in said chamber, means to provide fluid to said chamber in response to a pressure signal, means including a bleed orifice means for bleeding fluid under pressure from said chamber in response to a pressure bleed signal, said pressure and pressure bleed signals being separate from said first signal, and clamp valve means to prevent flow of fluid from said chamber through said bleed orifice means in response to a separate second signal, whereby the position of said second diaphragm is determined by the amount of fluid flowing out of said chamber through the bleed orifice means.

2. The combination as specified in claim 1 and means spacing said first and second diaphragms apart to form a second chamber, passage means providing fluid pressure from said source of fluid under pressure to the second chamber formed between said diaphragms, and second valve means selectively connecting said second chamber between said diaphragms to atmospheric pressure in response to said first signal means.

3. A control valve for controlling fluid flow from a fluid pressure source to a low pressure area through a control opening, said valve including a first diaphragm having a closed position closing said control opening and movable to an open position to open said control opening an amount which is a function of the movement of said first diaphragm from its closed position, a second movable wall means in said valve aligned with and positioned to contact and support at least portions of said first diaphragm when the first diaphragm moves to open position, said valve having a chamber defined therein on the opposite side of said second movable wall means from said first diaphragm and said movable wall means being open to said chamber so that the position of said movable wall means is a function of the amount of fluid in said chamber, said chamber being closed except for fluid inlet means and fluid outlet means, means responsive to separate signals to control fluid flow to said chamber through said fluid inlet means with said outlet means closed to provide a control fluid volume in said chamber, means to open said fluid outlet means in response to a signal to permit fluid to bleed from said chamber, means to close said fluid outlet means in response to a desired signal to trap fluid in said chamber as a function of the time the fluid outlet means is open, said second movable wall means being free to move away from said first diaphragm as the fluid volume in said chamber is reduced, and separate fluid pressure means for causing said first diaphragm to remain in its closed position regardless of the fluid volume in said chamber, and means to release said separate fluid pressure means to cause said first diaphragm to be moved toward its open position supported by said second movable wall means.

4. The combination as specified in claim 3 wherein said first diaphragm and said second movable wall means are spaced apart to form a second chamber, means providing a fluid pressure connection between said second chamber and said fluid pressure source, and pilot valve means to close off the fluid pressure from said fluid pressure source to said second chamber and to connect said second chamber to a low pressure environment in response to operation of said means to release said separate fluid pressure means.

5. The combination of claim 4 and spring means biasing said second movable wall means toward said first diaphragm.

* * * * *